US012797997B2

(12) United States Patent
Guo et al.

(10) Patent No.: US 12,797,997 B2
(45) Date of Patent: Nov. 17, 2026

(54) FRICTION STIR TOOL COOLING METHOD

(71) Applicants: INSTITUTE FOR THE DEVELOPMENT AND QUALITY, MACAU, Macau (CN); AEROSPACE ENGINEERING EQUIPMENT (SUZHOU) CO., LTD., Suzhou (CN)

(72) Inventors: Dawei Guo, Macau (CN); Wenxiao Li, Suzhou (CN); Zhixiong Zhu, Suzhou (CN); Xiaoxia Xu, Suzhou (CN); Hu Wang, Suzhou (CN); Guoshun Yang, Suzhou (CN); Chitat Kwok, Macau (CN); Lapmou Tam, Macau (CN)

( * ) Notice: Subject to any disclaimer, the term of this patent is extended or adjusted under 35 U.S.C. 154(b) by 0 days.

(21) Appl. No.: 19/018,486

(22) Filed: Jan. 13, 2025

(65) Prior Publication Data

US 2025/0144739 A1 May 8, 2025

Related U.S. Application Data

(63) Continuation of application No. PCT/CN2023/118606, filed on Sep. 13, 2023.

(30) Foreign Application Priority Data

Oct. 12, 2022 (CN) ......................... 202211247139.7

(51) Int. Cl.
*B23K 20/00* (2006.01)
*B23K 20/12* (2006.01)

(52) U.S. Cl.
CPC ................................ *B23K 20/1225* (2013.01)

(58) Field of Classification Search
CPC B23K 20/1235; B23K 20/1245; B23K 20/12; B23K 20/122; B23K 20/125; B23K 20/1255; B23K 37/003; B23K 20/123
See application file for complete search history.

(56) References Cited

U.S. PATENT DOCUMENTS

| | | | | |
|---|---|---|---|---|
| 6,516,992 | B1 * | 2/2003 | Colligan | B29C 65/0681 228/222 |
| 8,814,026 | B2 * | 8/2014 | Kato | B23K 20/1235 228/2.1 |
| 8,998,066 | B2 * | 4/2015 | Matsunaga | B23K 20/1265 228/2.1 |
| 10,016,838 | B2 * | 7/2018 | Katoh | B23K 20/1255 |

(Continued)

FOREIGN PATENT DOCUMENTS

| | | |
|---|---|---|
| CN | 106001907 A | 10/2016 |
| CN | 106825905 A | 6/2017 |

(Continued)

OTHER PUBLICATIONS

Supplementary European Search Report, 23876453.4, Feb. 25, 2026.

*Primary Examiner* — Erin B Saad

(57) ABSTRACT

A friction stir tool cooling method is used for cooling a stirring pin and/or a shaft shoulder of a friction stir tool, it includes that the coolant is introduced into an inlet of a cooling channel, the cooling channel is provided inside the friction stir tool, and the inlet is provided on the side wall of the friction stir tool. The coolant flows downwards to the vicinity of the stirring pin and/or the shaft shoulder, the coolant turns upwards and flows out of the friction stir tool from an outlet. The outlet is provided on the side wall of the friction stir tool.

4 Claims, 5 Drawing Sheets

(56) References Cited

U.S. PATENT DOCUMENTS

| | | | | |
|---|---|---|---|---|
| 10,421,150 | B2 * | 9/2019 | Odakura | B23K 20/1235 |
| 10,456,858 | B2 * | 10/2019 | Landmark | B23K 20/123 |
| 11,305,375 | B2 * | 4/2022 | Landmark | B23K 20/123 |
| 2005/0045694 | A1 * | 3/2005 | Subramanian | B23K 37/06<br>228/112.1 |
| 2010/0176182 | A1 * | 7/2010 | Hanlon | B23K 20/126<br>228/2.1 |
| 2014/0326392 | A1 * | 11/2014 | Silvanus | B23K 20/1255<br>228/2.1 |
| 2017/0266755 | A1 * | 9/2017 | Katoh | F16C 19/30 |
| 2018/0071860 | A1 * | 3/2018 | Odakura | B23K 20/22 |
| 2018/0161850 | A1 * | 6/2018 | Gao | B23K 20/1295 |
| 2019/0126385 | A1 * | 5/2019 | Odakura | B23Q 11/14 |
| 2021/0402510 | A1 * | 12/2021 | Hori | B23K 33/00 |

FOREIGN PATENT DOCUMENTS

| | | | |
|---|---|---|---|
| CN | 107470772 | A | 12/2017 |
| CN | 109202262 | A | 1/2019 |
| CN | 215238524 | U | 12/2021 |
| CN | 219336363 | U | 7/2023 |
| KR | 20120055035 | A | 5/2012 |

* cited by examiner

FRICTION STIR TOOL COOLING METHOD

CROSS-REFERENCE TO RELATED APPLICATIONS

This application claims priority to Chinese Patent Application No. 202211247139.7, filed on Oct. 12, 2022, the entire disclosures of which are incorporated herein by reference.

TECHNICAL FIELD

The present application relates to the technical field of friction stir welding, and in particular to a friction stir tool cooling method.

BACKGROUND

The friction stir welding method, is characterized by small welding deformation and low residual stress, which enables it to eliminate defects such as pores, inclusions, and cracks. Additionally, it does not produce arc light, smoke, noise pollution, etc. . . . It can significantly reduce cost, save materials, optimize structure, and reduce the structural weight of aircraft, such characteristics have attracted the attention of scientific research institutions in various countries. The unique characteristics of this technology which are not present in other methods, led to its usage in the aerospace field. This method was chosen for the welding of longitudinal seams in the core stage storage tank section of the new generation launch vehicle.

During its application, the friction stir tool is installed on the main shaft of the friction stir device, it is driven to rotate and move by the friction stir device, the friction between the stirring head and the surface of the workpiece generates a large amount of heat to quickly soften the base material, thereby enabling processes like friction stir welding, friction surfacing or solid-state additive manufacturing. However, during the welding process, the increase in base metal temperature makes the workpiece deform, leading to grain growth and the worsening of the properties of the base metal. In addition, it increases the heat-affected zone of the welding zone and reduces the strength of the welding head and the welding quality. Therefore, it has become an important task that how to quickly reduce the temperature of welding tools.

In the related art, surface cooling methods are often used to cool friction stir tools. On the one hand, the temperature control of this cooling method requires surface cooling of the stirring pin or shaft shoulder of the friction stir tool at a far distance, and the heat is transferred to the position of the shaft shoulder and stirring pin, it does not directly cool the center of the friction stir tool close to the position of the shaft shoulder and the stirring pin, the cooling efficiency is low. On the other hand, when welding long-distance or large-thickness plates, the presence of heat accumulation and excessive friction stir temperature caused by unreasonable parameters will cause increased wear of friction stir tools, shortened service life, and reduced mechanical properties of the welding zone. In order to address these problems, the method of reducing the rotation speed and increasing the traverse speed was usually used to reduce the temperature of the friction stir tool. However, this method has a slow response, and it's not easy to obtain the appropriate welding parameters.

SUMMARY

In order to solve the above-mentioned technical problems, the present application provides a friction stir tool cooling method to improve the cooling efficiency of the friction stir tool.

The technical problems solved by the present application are achieved by adopting the following technical solutions:

- a friction stir tool cooling method for cooling the stirring pin and/or shaft shoulder of the friction stir tool, including:
- a coolant is introduced into the inlet of the cooling channel, the cooling channel is provided inside the friction stir tool, and the inlet is provided on the side wall of the friction stir tool;
- the coolant flows downward to the vicinity of the stirring pin and/or shaft shoulder; and
- the coolant turns upward and flows out of the friction stir tool from an outlet, and the outlet is provided on the side wall of the friction stir tool.

In certain embodiment, the position of the inlet is higher than the position of the outlet.

In certain embodiment, the longitudinal section of the cooling channel is V-shaped.

In certain embodiment, the coolant flows downward to the vicinity of the stirring pin and/or shoulder, which specifically includes:

- when the coolant flows downward to the vicinity of the stirring pin and/or the shoulder, it surrounds the stirring pin and/or the shoulder for at least one turn.

In certain embodiment, the friction stir tool cooling method further includes a supporting step:

- the friction stir tool is supported radially and/or axially.

The friction stir tool cooling method further includes a sealing step:

- the inlet is slidably sealed relative to the friction stir tool, and/or
- the outlet is slidably sealed relative to the friction stir tool.

In certain embodiment, the friction stir tool cooling method further includes a collection step:

- the coolant flowing out of the outlet is collected below the outlet.

In certain embodiment, the friction stir tool cooling method further includes a flow-throwing step:

- the coolant flowing out of the outlet is thrown away from the outer wall of the friction stir tool below the outlet.

In certain embodiment, the friction stir tool cooling method further includes:

- the coolant lowing out of the outlet is sucked away, and/or
- an inert gas is introduced to the lower end of the friction stir tool.

In certain embodiment, the friction stir tool cooling method further includes a temperature adjustment step:

- temperature detection is conducted on the friction stir tool;
- the flow rate of the coolant delivered to the friction stir tool is adjusted, according to the temperature of the friction stir tool;
- if the temperature of the friction stir tool is greater than the pre-set value, the flow rate of the coolant is increased;

If the temperature of the friction stir tool is less than the pre-set value, the flow rate of the coolant is reduced.

The beneficial effects of the present application are:

The friction stir tool cooling method of the present application employs forced convection to cool the stirring pin and/or the shaft shoulder by introducing the coolant into the cooling channel inside the friction stir tool, which can effectively and promptly reduce the temperature of the stirring pin and/or the shaft shoulder. Especially when conducting the long-distance friction stir welding or large-thickness plate welding processes, the temperature of friction stir welding can be accurately and efficiently controlled by adjusting the flow rate of coolant, effectively extending the service life of the friction stir tool and improving the quality and mechanical properties of the weld. Moreover, the cold water can directly reach to the end of the friction stir tool, shortening the distance of heat conduction, thereby improving the cooling efficiency of the friction stir tool, and the coolant can stay briefly at the end of the friction stir tool, ensuring that the end of the friction stir tool is cooled.

BRIEF DESCRIPTIONS OF THE DRAWINGS

In order to more clearly describe the technical solutions in the embodiments of the present application or in the related arts, the drawings required for descriptions of the embodiments or the related arts will be briefly introduced below, obviously, the drawings described herein are merely some embodiments of the present application. Those skilled in the art can obtain other drawings based on these drawings without making creative work.

DETAILED DESCRIPTION

Figure 1:
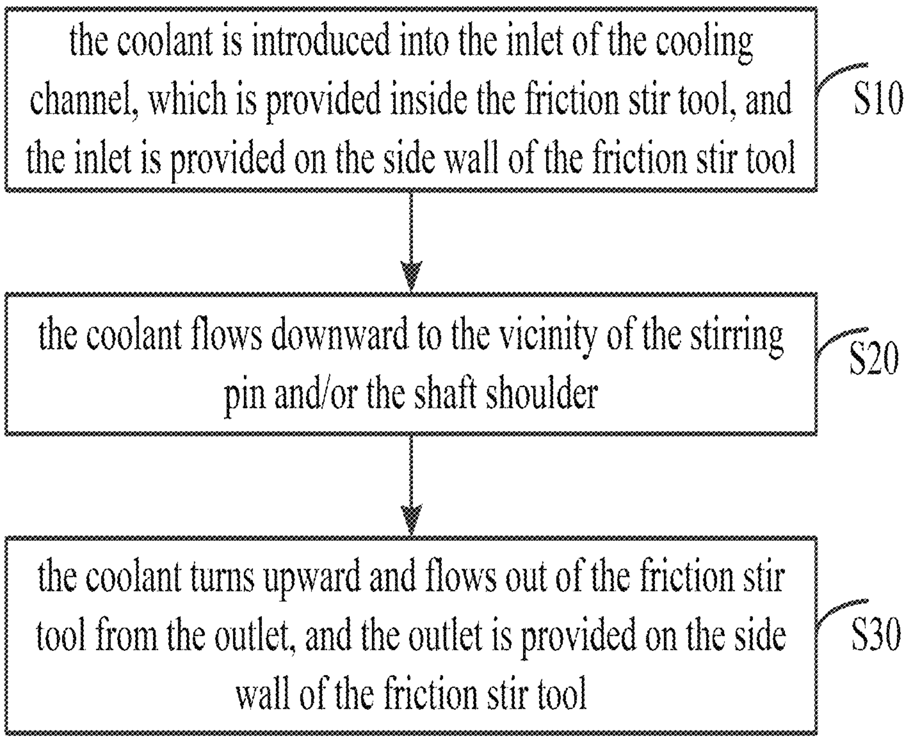
FIG. 1 is a flowchart of a friction stir tool cooling method according to the embodiments of the present application.
Figure 2:
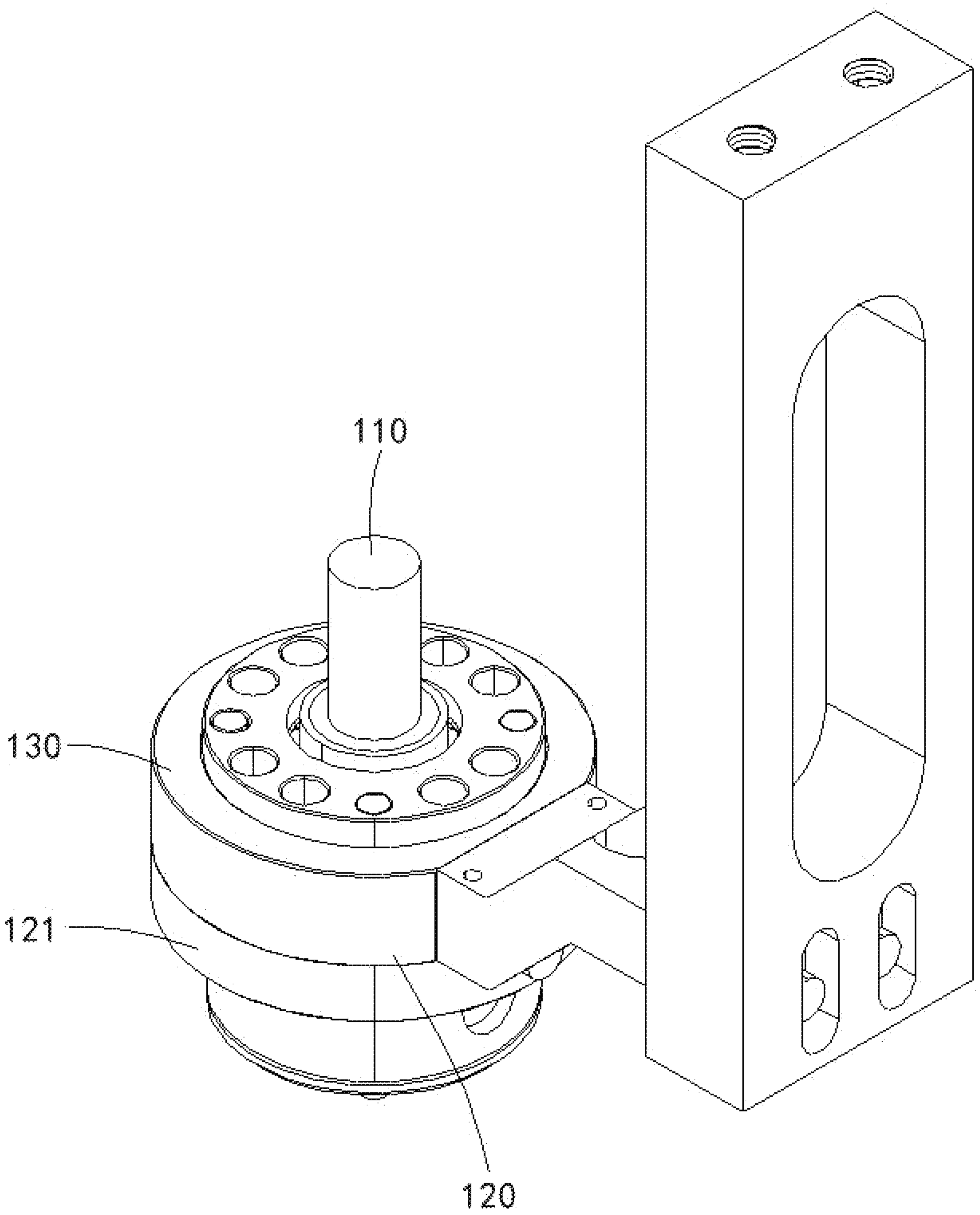
FIG. 2 is a schematic three-dimensional structural diagram of a friction stir tool according to the first embodiment of the present application.

In order to enable those skilled in the art to better understand the technical solutions of the present application, the present application will be described in detail below in conjunction with the accompanying drawings, the description in this part is only exemplary and explanatory, which shall not limit the scope of the present application in any way.

It should be noted that similar reference numerals represent similar items in the following figures, therefore, once an item is defined in one figure, it does not need further definition and explanation in subsequent figures.

It should be noted that the orientation or positional relationship indicated by the terms “center”, “upper”, “lower”, “left”, “right”, “vertical”, “horizontal”, “inner”, “outer”, etc., which is based on the orientation or positional relationship shown in the drawings, or the orientation or position relationship usually placed when the product of the invention is used, it is only for the convenience of describing the present application and simplifying the description, and does not indicate or imply that the device or component referred to must have a specific orientation, be constructed and operated in a specific orientation, therefore, it cannot be construed as a limitation of the present application. Further, the terms “first”, “second”, etc. are only used to differentiate descriptions, while cannot be understood as indicating or implying relative importance.

Furthermore, the terms “horizontal,” “vertical,” and “overhanging,” etc. do not imply a requirement that the components are absolutely horizontal or overhanging, but rather may be slightly tilted. For example, “horizontal” only means that its direction is more horizontal than “vertical”, it does not mean that the structure must be completely horizontal, but can be slightly tilted.

In the description of the present application, it should also be noted that, unless otherwise clearly stated and limited, the terms “set”, “install”, “connect” and “link” should be understood in a broad sense. For example, it can be a fixed connection, it can also be a detachable connection or an integral connection; it can be a mechanical connection or an electrical connection; it can be a direct connection or an indirect connection through an intermediate medium; it can be an internal connection between two components. For those skilled in the art, the specific meanings of the above terms in the present application can be understood on a case-by-case basis.

Friction stir welding uses the friction between the stirring head and the surface of the workpiece to generate a large amount of heat for quickly softening the base material, thereby achieving the work of friction stir welding, friction surfacing or solid-state additive manufacturing. However, during the welding process, the heat accumulation at the end of the friction stir tool and continuous increase in temperature, which can easily lead to a decrease in the mechanical properties of the friction stir tool tip and affect the welding effect. Taking friction stir welding of aluminum alloy as an example, during the working process, the surface temperature of the shaft shoulder 114 and stirring pin 115 of the friction stir tool 110 (tool steel, melting point is about 1400 degrees Celsius) can reach 550-600 degrees Celsius (the melting point of the aluminum alloy is about 660 degrees Celsius), the end of the friction stir tool 110 is continuously subjected to high degree of thermal evolution and wear behaviors. When welding the long-distance or large-thickness aluminum alloy plates, heat accumulates at the end of the friction stir tool 110 and the temperature continues to rise, resulting in a decrease in the mechanical properties of the end of the friction stir tool 110 and the inability to efficiently stir the aluminum plate at the welding zone. Meanwhile, it will lead to a reduction in the life of the friction stir tool 110 and a reduction in weld performance.

In view of this, the present application provides a friction stir tool cooling method, by introducing the coolant into the cooling channel inside the friction stir tool, forced convection cooling of the stirring pin and/or shaft shoulder can be achieved, which can effectively and promptly reduce the temperature of the stirring pin and/or the shaft shoulder. Especially when conducting long-distance friction stir welding or large thickness welding processes, precise and efficient control of the friction stir welding temperature can be achieved by adjusting the flow rate of the coolant, which effectively extends the service life of the friction stir tool and improves the weld quality and mechanical properties. Moreover, the cold water reaches directly to the end of the friction stir tool, which shortens the distance of heat conduction, thereby improving the cooling efficiency of the friction stir tool, and the coolant can stay briefly at the end of the friction stir tool, thereby ensuring that the end of the friction stir tool is cooled down.

Referring to FIG. 1, the friction stir tool cooling method includes the following steps:

step S10: the coolant is introduced into the inlet 113 of the cooling channel 111, the cooling channel 111 is provided inside the friction stir tool 110, and the inlet 113 is provided on the side wall of the friction stir tool 110;

step S20: the coolant flows downward to the vicinity of the stirring pin 115 and/or the shaft shoulder 114;

step S30: the coolant turns upward and flows out of the friction stir tool 110 from the outlet 112, the outlet 112 is provided on the side wall of the friction stir tool 110.

The inlet 113 in step S10 can be connected to one end of the water pump through the inlet pipe, and the other end of the water pump is connected to the water tank. The inlet 113 can be an arc-shaped opening or a trumpet-shaped opening opened on the side wall of the friction stir tool 110, and the direction of the arc-shaped opening or the trumpet-shaped opening is consistent with the rotation direction of the friction stir tool 110, thereby reducing resistance, increasing the amount of coolant entering and accelerating the movement of the fluid in the cooling channel 111.

The outlet 112 and the inlet 113 in step S30 may be located on the same side of the friction stir tool 110, or may be located on two opposite sides of the friction stir tool 110, and the inlet 113 is located higher than the outlet 112 position to facilitate the flow of coolant, thereby reducing the flow resistance of the coolant and helping to improve the flow rate and cooling efficiency of the coolant.

Figure 3:
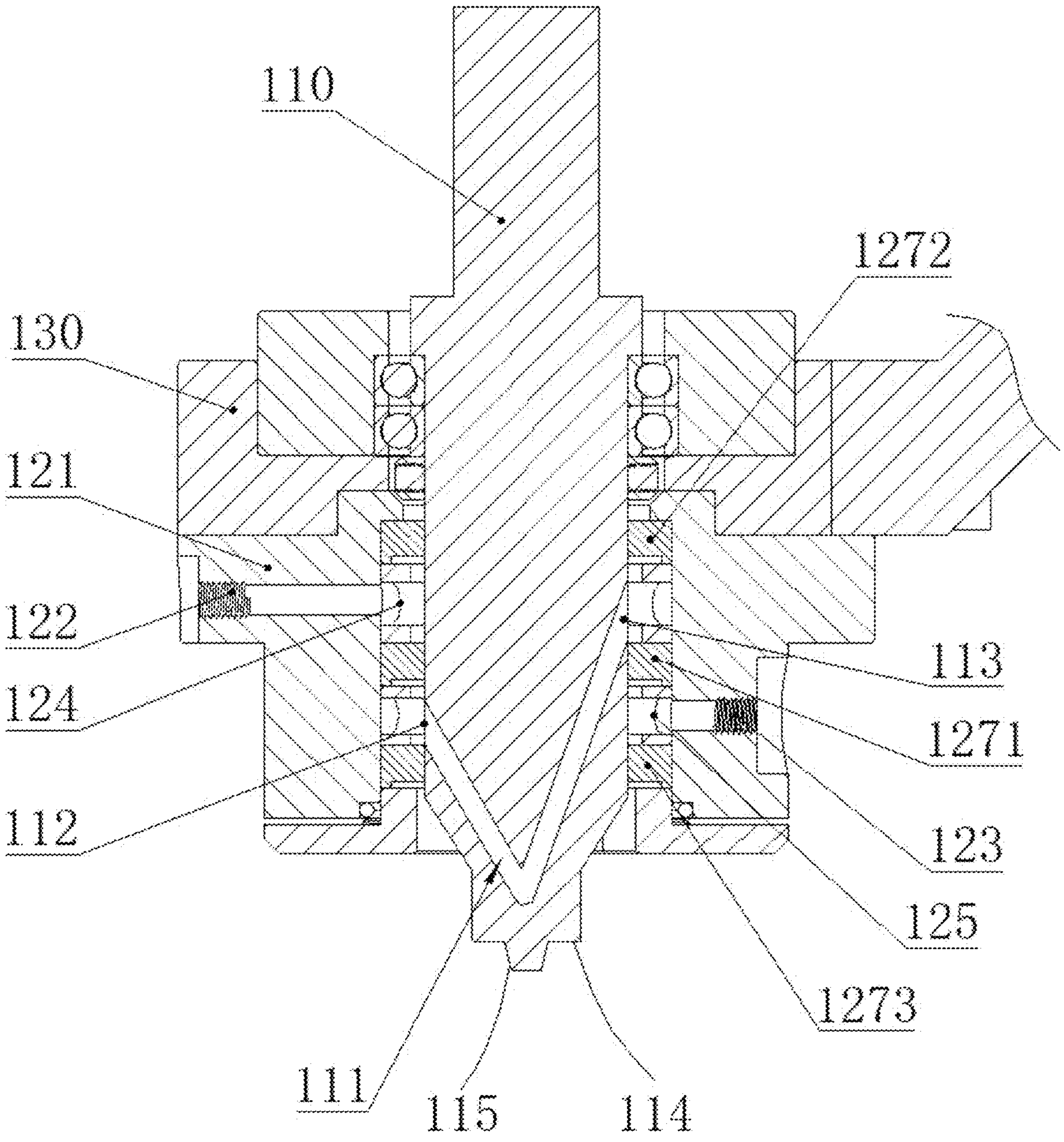
FIG. 3 is a cross-sectional view of a friction stir tool according to the first embodiment of the present application.

Referring to FIG. 3, the cooling channel 111 can be a flow channel with a V-shaped longitudinal section, and two intersecting deep holes are machined on the friction stir tool 110 by machining (the machining can be drilling or EDM processing), the two deep holes extend downward inside the friction stir tool 110 and intersect near the stirring pin 115 and/or the shaft shoulder 114 of the friction stir tool 110 to form a cooling channel 111 with a V-shaped longitudinal section.

In certain embodiments of the present application, the coolant flowing downward to the vicinity of the stirring pin 115 and/or the shaft shoulder 114 in step S20 includes: the coolant flowing downward to the vicinity of the stirring pin 115 and/or the shaft shoulder 114 surrounds the stirring pin 115 and/or shoulder 114 for at least one turn.

Figure 5:
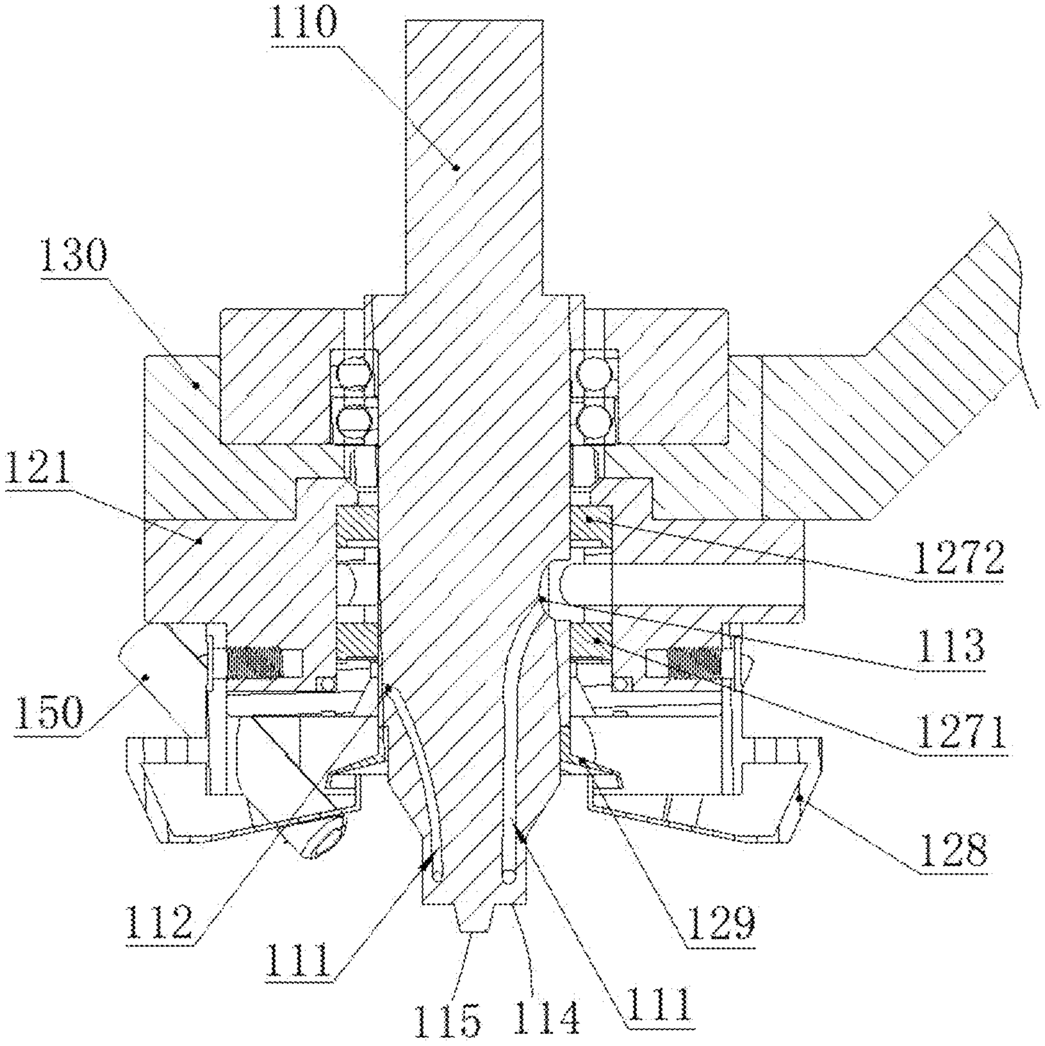
FIG. 5 is a cross-sectional view of a friction stir tool according to the second embodiment of the present application.

Referring to FIG. 5, the cooling channel 111 adopts a complex special-shaped flow channel, the special-shaped flow channel extends downward from the inlet 113, and surrounds the stirring pin 115 and/or the shaft shoulder 114 for at least one turn when it is close to the stirring pin 115 and/or the shoulder 114 to form an annular flow channel, and then turns upward and extends for connecting to the outlet 112, so that when the coolant flows downward to the vicinity of the stirring pin 115 and/or the shaft shoulder 114, after surrounding the stirring pin 115 and/or the shaft shoulder 114 for at least one turn, it flows upward from the outlet 112. It should be noted that since the special-shaped flow channel is inconvenient for machining, the friction stir tool 110 can be manufactured using a solid-state additive manufacturing method.

In certain embodiments of the present application, a supporting step is further included: the friction stir tool 110 is supported radially and/or axially.

Specifically, referring to FIG. 2 to FIG. 5, a flow conveying mechanism 120 is provided on the outside of the friction stir tool 110. The flow conveying mechanism 120 includes a support member 130. The support member 130 includes a mounting bracket for providing on the friction stir device and a main body sleeve 121 provided on the mounting bracket. The friction stir tool 110 passes through the mounting bracket and the main body sleeve 121 in sequence, and the friction stir tool 110 is rotationally connected to the mounting bracket through the bearing, the relative axial distance between the friction stir tool 110 and the mounting bracket is limited by the axial limiting mechanism, thereby achieving radial and axial support of the friction stir tool 110. The axial limiting mechanism can adopt existing technology, such as a locking buckle, which will not be described in detail again herein.

The main body sleeve 121 is provided with an inlet channel 122 for delivering the coolant to the inlet 113 and an outlet channel 123 for receiving the coolant flowing out of the outlet 112. The inlet channel 122 can be connected to the water pump through the inlet pipe, so that the speed and opening of the water pump can be remotely controlled from a distance, thereby enabling remote temperature control. The coolant is transported from the inlet 113 to the cooling channel 111 through the inlet channel 122 to cool the stirring pin 115, and then discharged from the outlet 112 through the outlet channel 123. By cooling the tool shoulder 114 and the stirring pin 115 of the friction stir tool 110, its mechanical properties are increased and its service life is extended.

In this embodiment, the coolant is water flow, and the temperature of the water flow does not exceed the ambient temperature, so as to form a large temperature difference with the friction stir tool 110 in friction stir operation, thereby improving the cooling efficiency of the friction stir tool 110.

Further, the friction stir tool cooling method also includes a sealing step: the inlet 113 is slidably sealed relative to the friction stir tool 110, and/or the outlet 112 is slidably sealed relative to the friction stir tool 110.

Referring to FIG. 3, a first support ring 124 is provided between the inlet channel 122 and the inlet 113, the inlet channel 122 is connected with the inlet 113 through the first support ring 124, a second support ring 125 is positioned between the outlet channel 123 and the outlet 112, and the outlet channel 123 is connected with the outlet 112 through the second support ring 125. And the first support ring 124 and the second support ring 125 are fixed relative to the main body sleeve 121, but rotate relative to the friction stir tool 110. A first sealing member 1271 is provided between the first support ring 124 and the second support ring 125, and a second sealing member 1272 is provided on the upper part of the first support ring 124. And an upper sealing cavity is formed between the second sealing member 1272 and the first sealing member 1271. A third sealing member 1273 is provided at the lower part of the second support ring 125, and a lower sealing cavity is formed between the third sealing member 1273 and the first sealing member 1271.

As the position of the inlet 113 is higher than the position of the outlet 112, the upper sealing cavity can be provided as the water inlet cavity, and the lower sealing cavity can be provided as the water outlet cavity. When the coolant enters from the inlet channel 122, it is restricted between the first sealing member 1271 and the second sealing member 1272, and it can only enter the cooling channel 111. Meanwhile, the coolant in the lower seal cavity is restricted between the first sealing member 1271 and the third sealing member 1273, it can only enter the outlet channel 123. Generally, the temperature in the lower sealing cavity is higher, because the coolant has passed through the stirring pin 115 and/or the shaft shoulder 114 and absorbed heat, therefore, the liquid with a higher temperature is prevented from leaking into the upper sealing cavity, which improves the cooling efficiency.

In certain embodiments of the present application, a collection step is also included: the coolant flowing out from the outlet 112 is collected below the outlet 112.

Figure 4:
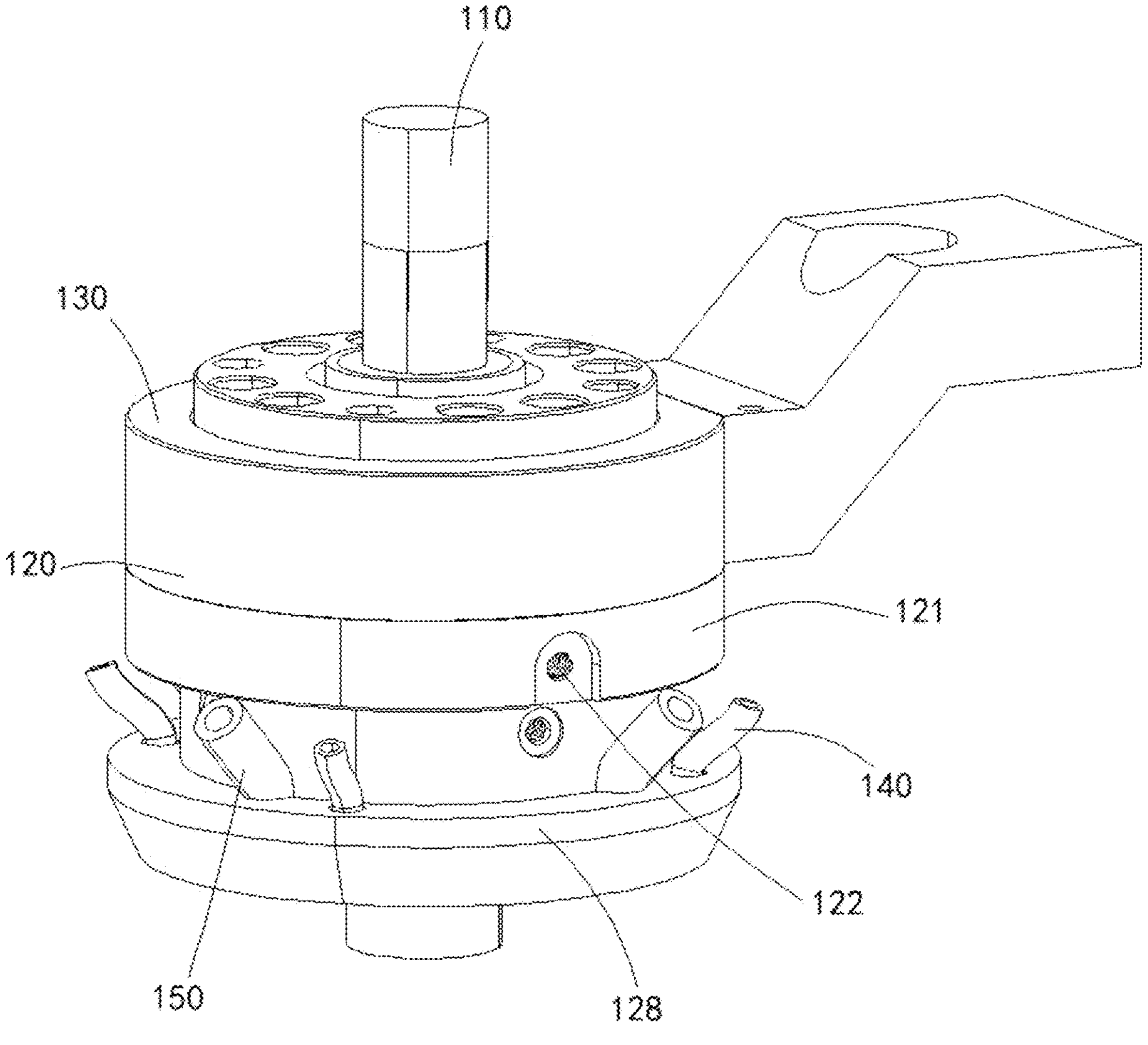
FIG. 4 is a schematic three-dimensional structural diagram of a friction stir tool according to the second embodiment of the present application.

Referring to FIG. 4 and FIG. 5, a chassis 128 is provided at the lower part of the flow conveying mechanism 120, the friction stir tool 110 passes through the chassis 128, and the chassis 128 is provided with a receiving cavity for collecting the coolant flowing out from the outlet 112.

The coolant is transported into the cooling channel 111 through the inlet 113 to cool the stirring pin 115 and/or the shaft shoulder 114. The cooled coolant flows out from the outlet 112 to the receiving cavity of the chassis 128 for storage, which reduces the temperature at the shaft shoulder 114 and the stirring pin 115 of the friction stir tool 110.

Furthermore, a flow-throwing step is also included: the coolant flowing out from the outlet 112 is thrown away from the outer wall of the friction stir tool 110 below the outlet 112.

Referring to FIG. 5, the outer wall of the friction stir tool 110 located below the outlet 112 is provided with a flow-throwing ring 129. The flow-throwing ring 129 is used to guide the coolant flowing out from the outlet 112 into the receiving cavity on the chassis 128, preventing the coolant flowing out from the outlet 112 from flowing along the outer wall of the friction stir tool 110 to the welding part and affecting the welding quality.

In this embodiment, the flow-throwing ring 129 is tilted downward from the inside to the outside, so that the coolant flowing out from the outlet 112 can flow along the flow-throwing ring 129 to the receiving cavity due to gravity.

In certain embodiments of the present application, the friction stir tool cooling method further includes: the coolant flowing out from the outlet 112 is sucked away, and/or an inert gas is introduced to the lower end of the friction stir tool 110.

Specifically, the coolant flowing out from the outlet 112 can be sucked away by providing a water suction pipe 140 connected to the receiving cavity on the chassis 128. The water suction pipe 140 is used to suck the coolant in the receiving cavity. When in use, the water suction pipe 140 is connected to a pumping device such as a water pump to pump out the coolant in the receiving cavity.

To transport the inert gas to the lower end of the friction stir tool 110, a gas pipe 150 facing the end of the friction stir tool 110 can be provided on the chassis 128, the friction stir tool 110 and the welded specimens are protected by introducing an inert gas into the end of the friction stir tool 110 through the gas pipe 150. Argon gas can be used as the inert gas.

Furthermore, temperature adjustment steps are also included:

- temperature detection is performed on the friction stir tool 110;
- according to the temperature of the friction stir tool 110, the flow rate of the coolant delivered to the friction stir tool 110 is adjusted;
- if the temperature of the friction stir tool 110 is greater than the pre-set value, the flow rate of the coolant is increased;
- if the temperature of the friction stir tool 110 is lower than the pre-set value, the flow rate of the coolant is reduced.

The temperature of the friction stir tool 110 can be detected by using an infrared temperature measurement device, the infrared temperature measurement device is connected to an external controller to send the detected temperature value to the controller in time, and the controller controls the opening of the water pump through the controller, which allows the flow rate of the coolant to be adjusted.

It should be noted that, as used herein, the terms "include", "comprises" or any other variation thereof are intended to cover a non-exclusive inclusion, such that a process, method, article or equipment including a series of elements not only includes those elements, they also include other elements not expressly listed or inherent in the process, method, article or equipment.

This application uses specific examples to illustrate the principles and implementation methods of the present application, the description of the above-mentioned examples is only used to help understand the method and the core idea of the present application, the above are only preferred embodiments of the present application. It should be pointed out that due to the limitations of written expressions, there are objectively unlimited specific structures, for those skilled in the art, without departing from the principles of the present application, some improvements, modifications or changes can also be made, or the above technical features can be combined in an appropriate manner; these improvements, modifications or combinations, or the concepts and technical solutions of the invention are directly applied to other situations without improvement, all should be regarded as the protection scope of the present application.

What is claimed is:

1. A friction stir tool cooling method, used to a friction stir tool with cooling function to cool a stirring pin and/or a shaft shoulder of the friction stir tool, wherein the friction stir tool comprises:

- the stirring pin and/or the shaft shoulder; and
- an input cooling channel for connecting an inlet and an output cooling channel for connecting an outlet;
- wherein a flow conveying mechanism is provided on an outside of the friction stir tool, a chassis is provided at a lower part of the flow conveying mechanism, the friction stir tool passes through the chassis, and the chassis is provided with a receiving cavity for collecting the coolant flowing out from the outlet;
- wherein one end of the input cooling channel is intersected with one end of the output cooling channel at a position between a bottom of the chassis and a horizontal shoulder surface of the shaft shoulder to form a cooling channel with a V-shaped longitudinal cross-section that extends from the input to the position, and then continues from the position to the outlet;
- the input cooling channel extends inclinedly downward from the inlet, and surrounds the stirring pin and/or the shaft shoulder for at least one turn when reaching the position to form an annular flow channel, and then the output cooling channel turns upward inclinedly and extends to the outlet;
- wherein the method comprises:
- a coolant is introduced into the inlet of the input cooling channel, the coolant flows inclinedly downward to the stirring pin and/or the shaft shoulder and turns inclinedly upward from the position and flows out of the friction stir tool from the outlet.

2. The friction stir tool cooling method of claim 1, further comprising:

- the coolant flowing out of the outlet is thrown away from the outer wall of the friction stir tool below the outlet.

3. The friction stir tool cooling method of claim 2, further comprising:

- the coolant flowing out of the outlet is sucked up, and/or inert gas is delivered to a lower end of the friction stir tool.

4. The friction stir tool cooling method of claim 1, further comprising:

- temperature detection is performed on the friction stir tool;

a flow rate of the coolant delivered to the friction stir tool is adjusted according to a temperature of the friction stir tool;

if the temperature of the friction stir tool is greater than a pre-set value, the flow rate of the coolant is increased; and if the temperature of the friction stir tool is less than the pre-set value, the flow rate of the coolant is reduced.

* * * * *